US005089311A

United States Patent [19]

Ligon, Sr.

[11] Patent Number: 5,089,311

[45] Date of Patent: Feb. 18, 1992

[54] OPEN FACED SANDWICH BARRIER

[75] Inventor: James T. Ligon, Sr., Almont, Mich.

[73] Assignee: Ligon Brothers Manufacturing Company, Almont, Mich.

[21] Appl. No.: 448,344

[22] Filed: Dec. 11, 1989

[51] Int. Cl.[5] ............................ B32B 1/08; B32B 5/18

[52] U.S. Cl. ........................................ 428/71; 428/99; 428/188

[58] Field of Search ....................... 428/71, 76, 99, 188

[56] References Cited

U.S. PATENT DOCUMENTS

| | | | |
|---|---|---|---|
| 4,284,673 | 8/1981 | Ockels | 428/54 |
| 4,377,609 | 3/1983 | Bartoli et al. | 428/71 |
| 4,565,723 | 1/1986 | Hirsch | 428/71 |
| 4,657,798 | 4/1987 | Guilhem | 428/71 |
| 4,725,471 | 2/1988 | Imhoff | 428/71 |
| 4,764,408 | 8/1988 | Stedman et al. | 428/71 |
| 4,810,548 | 3/1989 | Ligon, Sr. | 428/71 |
| 4,988,553 | 1/1991 | Saiki et al. | 428/99 |

*Primary Examiner*—Henry F. Epstein

*Attorney, Agent, or Firm*—Miller, Morriss & Pappas

[57] ABSTRACT

A barrier for closing and sealing a tubular passage while permitting ingress and egress of coating material into and out of the passage and with a mat of expandable adherent material secured to a barrier plate, the expansion and sealing actuated by exposure to curing heat.

3 Claims, 2 Drawing Sheets

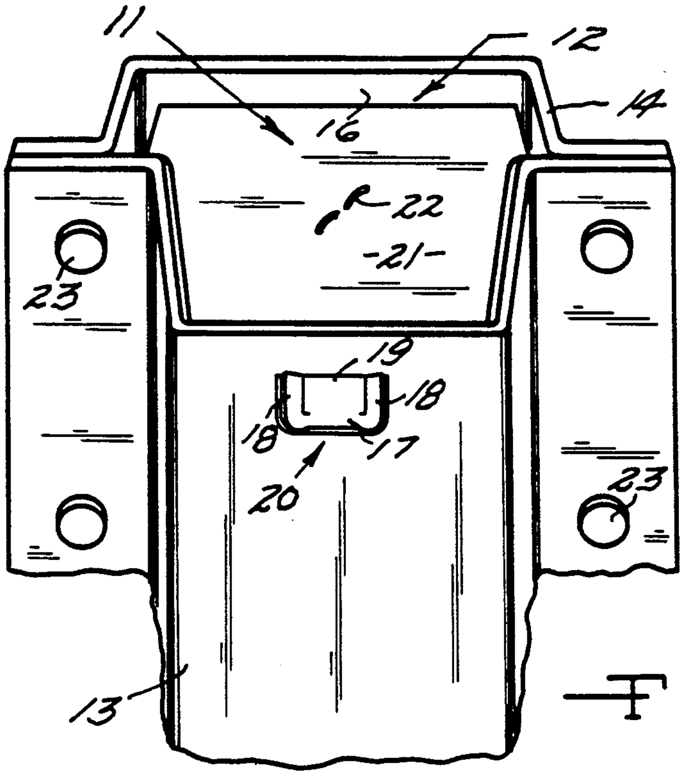
FIG. 1
FIG. 2
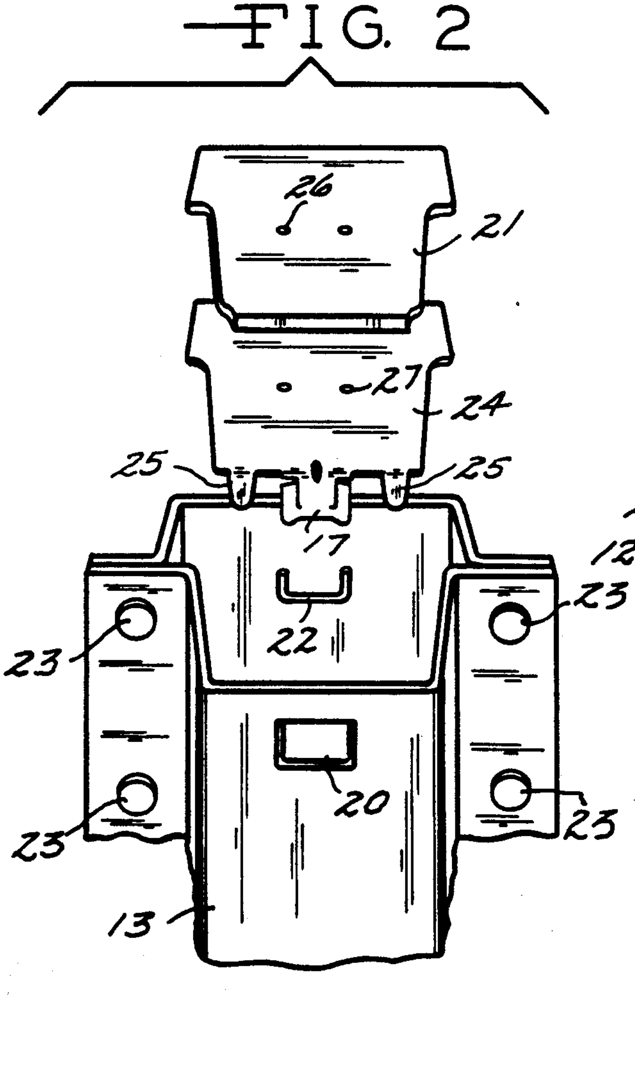
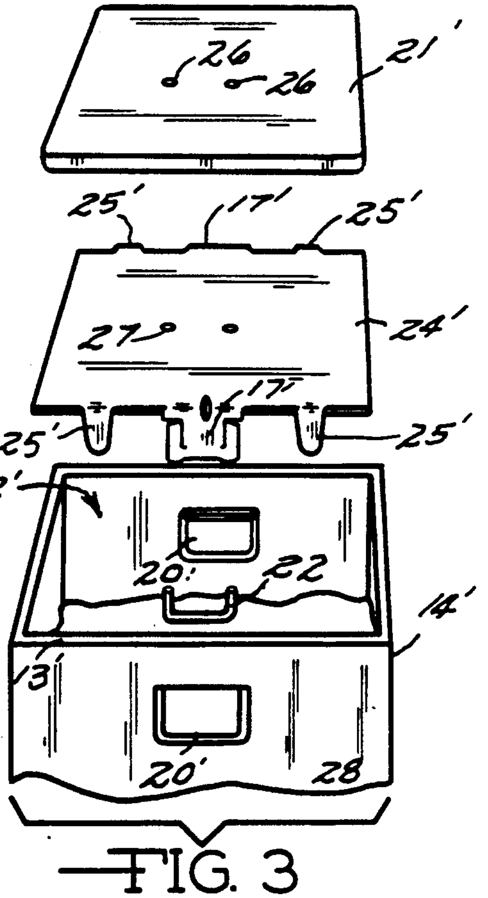
FIG. 3

OPEN FACED SANDWICH BARRIER

The present invention is an improved barrier-closure structure of the open faced sandwich type for closing a passage in skeletal or panel structures as found in automotive constructions and the like. The barriers isolate such passages form the conduction of gases, fumes and moisture in prevention of road dirt from penetrating the structure and in prevention of corrosive materials entering the body and frame with resultant costly structural damage to panels and structural parts from rust, galvanic action and other exposure generated deterioration.

In the development of such barriers, especially for automotive use, a variety of barrier shapes have been devised to approximate the open cross sectional configuration in tubular passages and always with a close consideration for economy and effectiveness since the structural frames and bodies are dipped in coating compounds. The frames and bodies (including passages) then must be drained, dried and subsequently be subjected to a heated curing of the paint or coating. During the coating, draining and drying, perimeter openings around the barriers must be provided for ingress and egress of the coating material and, as ultimate curing heat is applied, the same heat expands and cures a foam seal as provided between a pair of registering plates defining the configuration of the passage and retained in relative stand-off spaced relation to the walls of the passage to be ultimately closed. Such barrier-closure structures are principally used in automotive frame passages so that at curing, the two spaced apart plates confine the expanding form-adhesive material activated by curing heat) into and around th edges of the plates and locating and spacing fixtures in respect to adjacent walls to effectively seal the passages. The prior art seal structures are set out in U.S. Pat. No. 4,810,548. While such structures as in U.S. Pat. No. 4,810,548 are effective as barriers establishing closure elements in substantially vertical passages and horizontally oriented passages at the curing stage, they are more expensive than they need to be in the vertically oriented passages and the present invention addresses the effective handling of such vertical passages for sealing after dipping, draining, drying and, at final, curing. In the latter or curing step the present invention reacts to close the perimeter clearances and to achieve a selected air tight barrier across the vertical passages at curing, and at substantially reduced cost and with equal effectiveness.

Accordingly the principal object is to present a differently developed open faced barrier-closure structure useful in substantially horizontal position across the vertical passages, at curing, for effectively blocking those vertical passages while permitting coating by immersion, draining, and drying.

Another object is to express a new and unobvious procedure for sealing substantially vertical passages in conjunction with coating, draining, drying and curing of materials reaching into the passages.

Other objects including noise suppression, economical blocking apparatus and procedural improvement, in selective blocking of passages or ducts which are more or less vertically oriented at curing will be appreciated as the description proceeds.

GENERAL DESCRIPTION

The open faced sandwich barrier structure of the present invention comprises a relatively thin barrier support plate of rigid material configured to be similar to, but somewhat smaller than, an opening to be ultimately sealed in a vertically oriented tubular passage such as found in pillars or columns. The barrier support plate is attached to a substantially similar shaped and relatively flat resilient planar mat which is expandable upon the application of heat as for example by the foaming of the mat at actuation. The mat rests upon the upper surface of the barrier plate ("upper" surface being the uppermost surface of the plate when the plate is generally horizontally disposed at the time of activation of the expandable material) and is secured to the barrier plate by physical fastening by an adhesive or by a mastic or other convenient adherance means. The barrier plate thus supports the expandable mat and provides a centering or locating function for the mat in spaced-apart perimeter relation to the surrounding interior walls of the passage which is to be ultimately blocked by the barrier structure. The barrier plate includes stabilizing and locating means for fixing the position of the barrier plate and the mat in selected transverse relation in respect to the walls of the passage. These stabilizing means may involve frictional or detent interlock against the walls of the passage or both.

The barrier structure is inserted in the passage allowing flow of liquid and gasses and even debris to enter gravitationally or under pressure around the perimeter of the barrier and to be subsequently drained therefrom and the residual coating material is then expanded and cured, with the coating, to the exposed surfaces of the barrier and walls. This curing usually involves a baking heat which, upon reaching the activating temperature of the expandable mat material, causes the material to expand or foam upward and outward with some flowing responsive to gravity in the position of the passage at curing. In the manner of an open faced sandwich the flow of expanding material flows to cover the gap between the perimeter walls and the barrier support plate and mat. In doing so, it adheres to the support plate and closes or seals against the adjacent wall surfaces to form the barrier, then blocking the intrusion of gas, dust or odors, and penetration by liquids.

BRIEF DESCRIPTION OF THE DRAWINGS

FIG. 1 is a front perspective view of an open columnar structure as found, for example, in automobile bodies and in which the open faced structure barrier of the present invention is in place transverse of the vertical opening and in spaced perimeter relation to the internal column walls and steadied in place by slot interlock detenting, as shown and as will be seen, by flange-like feet.

FIG. 2 is an exploded perspective view of the structure as seen in FIG. 1 and indicating the open faced barrier in which the expandable heat activated pad or mat, configured similar to the opening in the column, and generally matching the support plate, is secured thereto as the top or uppermost portion of the barrier assembly.

FIG. 3 is an exploded perspective view of a variant of the structure as in FIG. 2 and modified to include plural stabilizing means and the interlock pocket elements detentably mating with stabilizer extensions of the support plate for the expandable sheet of material.

Figure 5:
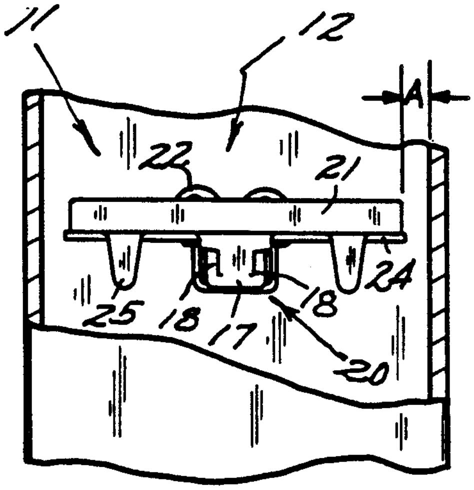

The FIG. 5 is a somewhat stylized frontal partial cross-section through the vertical wall indicating the gap between walls and barrier structure upon attachment of the open faced barrier in respect to the walls of the columnar opening.

Figure 6:
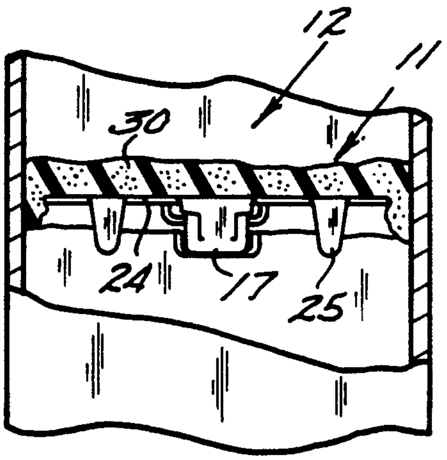

FIG. 6 is a frontal partial cross section view as in FIG. 5 and indicating the expansion and perimeter gravity flow around the plate to seal the opening in the column at the barrier position of the activated open faced sandwich.

SPECIFIC DESCRIPTION

Referring to the Drawings, and firstly to the FIG. 1 thereof, the open faced sandwich barrier structure 11 of the present invention is shown in a vertically oriented passage 12 typical in automotive frame and body construction. The passage 12 is formed, for example, as a tubular complex or composite of metal stampings 13 and 14 or of a resin filled and formed element. As is illustrated the cross sectional of the barrier structure configuration is frequently irregular in spaced apart registry with the wall of the opening 12. In the FIG. 1 the barrier structure 11 is seen positioned in the columnar passage 12 in spaced relation to the internal perimeter walls 15 and 16 and the barrier 11 is rigidly oriented transversely across the passage 12, as shown, and retained in that position by fasteners 17, shown as a detenting type, the wings 18 of which pop into the lanced opening 19 at the top of the pocket 20 formed in selected of the walls 13. While other types of fasteners may be used the fastener 17, as shown, is a preferred integral form extending from the barrier structure 11 and its planar support (not shown). The uppermost surface of the barrier structure 11 is a mat 21 of heat activatable foaming or expanding and adhering material physically adhered to the baffle plate 24 or planar support element of the barrier structure 11, as will be seen. The preferred connection, because of economy and convenience, is by the means of the staple 22 which passes through the plate and the mat 21, and the staple 22 clinches the two in generally uniform registry with a stand-off at the internal walls 15 and 16 of the passage 12.

The wall elements 13 and 14 forming the columnar or pillar construction shown are flanged and the flanges are closed by rivets or the like 23. In some instances this is achieved by welding, integral forming or other conventional means.

In the FIG. 2, the principal support role of the baffle plate 24 is best understood in relation to the mat 21 which is attached thereto and the integral steadying feet 25 and the integrally formed fastener 17. The registry between the mat 21 and planar upper surface of the baffle plate 24 in a perimeter similarity to the configuration of a transverse section through the passage 12 is also readily appreciated. The interrelationship of the pocket 20 in the columnar wall 13 is also clear. The staple 22 is also visible for insertion through the openings 26 and 27 in the mat 21 and plate 24 upon clinching as in Fig. 1. With heavy duty staplers, the staples 22 may be driven and clinched in a single operation. Plate 24 is of light gauge sheet metal.

Fig. 3 indicates a slightly variant columnar passage 12' in an integral arrangement of perimeter walls 13' and 14' with plural positioned pockets 20' through the box-like tubular walls 28 in receipt of the plural fasteners 17' as integrally depending from the baffle plate 24'. Steadying and locating feet 25' are also intgegral with and depend from the plate 24'.

The mat 21' generally is in register with the upper surface of the baffle plate 24', as shown, and in other particulars, the description in FIG. 2 is applicable. The baffle plate 24' assures perimeter spacing from the internal surfaces of passage 12' except for the locating and steadying fasteners 17' and feet 25 respectively which extend and depend from the integral plate 24' to contact with the walls 28.

Figure 4:
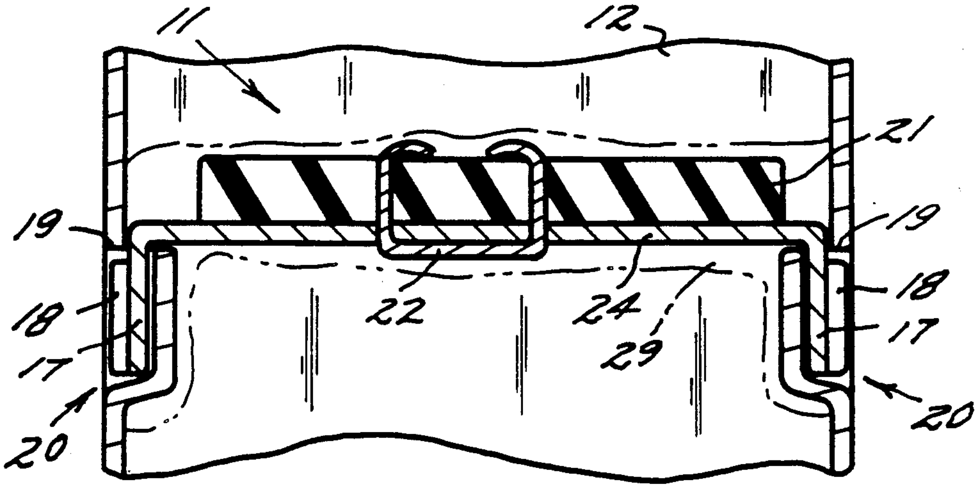
FIG. 4 is a full cross section through the barrier structure of FIG. 3 and indicating that the open-faced sandwich is in position for activation and ultimate expansion as represented by the phantom-line to close all openings when expanded.

In the FIG. 4 a barrier structure 11 is shown in cross section positioned transverse of the passage 12 and interlocked therewith at the walls by fasteners 17 which are integral extensions from the baffle plate 24. These fasteners 17 are slid into the pockets 20 formed in the walls of the passage 12. The wings 18, which are bent slightly outwardly, are seen to expand after insertion of the fastener 17 into the pocket 20 at the lanced portion 19 in prevention of withdrawal. (FIGS. 1 and 3 indicate the outward bending of the wings 18 to provide a detent retention). The mat 21, of expandable material, rides on the upper surface of the baffle plate 24 and is secured thereto. The staple 22 provides an excellent securing means and clinches the baffle plate 24 and mat 21 together. Thus located, the open faced barrier 11 is in spaced apart relation to passage 12 permitting ingress and egress of air, paint, and coating materials. On draining the coating materials are dried and cured. At curing, the structure is oriented vertically, as shown in FIG. 4 and the heat of curing activates the foam material comprising the mat 21 and the phantom line represents the extent of foaming and flowing upwardly and outwardly to blanket or cover the entire upper surface (as shown) of the baffle plate encapsulating the staple 22 and staple openings and filling and sealing the assembly at the selected position and plugging the passage 12 at the position shown. The approximate typical extent of the flow is indicated by the phantom line portion 29.

In FIg. 5 the cut away provides an illustration of the perimeter gapping A of open faced barrier element 11 in the tubular passage 12 with the steadying feet 25 and fasteners 17 in locating contact with the internal surfaces of the passage 12. The mat 21 is shown in its non-activated condition and ingress and egress to the passage through the gap A will be appreciated. In FIG. 6 the open faced barrier structure 11 has been activated and the encapsulation of the structure 11 and the adhesive character of the foam material 30 at curing is seen effectively sealing the passage 12 against the intrusion of gases, liquids, dust and the sealed baffle creates an effective sound barrier.

The expandable and adherent material of the mat 21 is heat sensitive and activation of the expansion of the material of mat 21 does not occur during dipping, draining, and drying. The heat curing of the paint or coating material elevates the temperature of the mat 21 so that as the volume increases, the material of the mat flows to achieve an adherent encompassing seal peripherally around the plate 24 and filling any incidental voids while solidifying the composite interlock of the barrier seal 11 to the internal surfaces of the walls of the tubular opening 12 to achieve a gas tight chamber at selected intervals between barrier seals 11. The chambers are moisture and dust proof chambers in a structure which is rattle free with minimal addition of weight. The activating temperature of the expandable mat material cut from sheet form is adjustable by formulation and is available from Ciba-Geigy Chemical Company and from L & L Industries of Michigan.

The tubular passages 12 as herein described will be appreciated as postured in a vertical orientation at the time of activation of the mat 21. This allows preassembly of the barriers 11 and coating as by dipping, in any position, then orienting vertically to drain the tubular passages. While the tubular passages are positioned vertically, the heat curing of the coating thus activates and seals the described barrier.

Having thus described my invention and the preferred mode of use and manufacture, those ordinarily skilled in the art will appreciate improvements, modifications and changes and such improvements, modifications and changes are intended to be included as within the spirit of the present invention and limited only by the scope of the appended claims.

I claim:

1. An expandable closure-barrier for transversely and selectively sealing a tubular vertical columnar opening as defined by vertically disposed and joined walls the construction comprising:

a single baffle plate having a configuration similar to the transverse cross section of the opening in said tubular vertical column and in spaced relation to the internal walls of said column and said baffle plate having attached thereto a sheet of selectively expandable heat activatable sealing material generally coextensive with said principal planar portion of said baffle plate and on the uppermost surface thereof; and at least a single fastener and steadying means locating and steadying said baffle plate in a transverse position in respect to said opening in said vertical column.

2. In the combination of claim 1 in which said fastener is a perimeter-integral extension of said baffle plate.

3. In the combination of claim 1 in which said baffle plate includes one or more stabilizing foot extensions steadying and locating said baffle plate.

* * * * *